United States Patent
Ho et al.

(10) Patent No.: US 9,644,388 B1
(45) Date of Patent: May 9, 2017

(54) GLOBAL POSITIONING SYSTEM/FIRE SHELTER SYSTEM

(71) Applicants: Dennis Ho, Daly City, CA (US); Norman Ho, Daly City, CA (US)

(72) Inventors: Dennis Ho, Daly City, CA (US); Norman Ho, Daly City, CA (US)

(73) Assignee: EVOKE INC., Daly City, CA (US)

( * ) Notice: Subject to any disclaimer, the term of this patent is extended or adjusted under 35 U.S.C. 154(b) by 0 days.

(21) Appl. No.: 15/224,544

(22) Filed: Jul. 30, 2016

(51) Int. Cl.
| | |
|---|---|
| *E04H 9/16* | (2006.01) |
| *A62C 2/06* | (2006.01) |
| *A62C 8/06* | (2006.01) |
| *E04H 15/02* | (2006.01) |
| *G01S 19/17* | (2010.01) |
| *A62C 3/02* | (2006.01) |

(52) U.S. Cl.
CPC .............. *E04H 15/02* (2013.01); *G01S 19/17* (2013.01); *A62C 2/06* (2013.01); *A62C 3/0257* (2013.01)

(58) Field of Classification Search
None
See application file for complete search history.

(56) References Cited

U.S. PATENT DOCUMENTS

| | | | | |
|---|---|---|---|---|
| 4,573,933 A * | 3/1986 | Cameron | ................ | B63C 9/04 441/16 |
| 5,341,973 A * | 8/1994 | Dawes | ................ | A45F 3/04 221/185 |
| 5,921,388 A * | 7/1999 | Petrilli | ................ | A62C 2/06 206/315.1 |
| 6,881,506 B2 * | 4/2005 | Anderson | ................ | B32B 7/08 135/116 |
| 7,128,207 B2 * | 10/2006 | Anderson | ................ | B32B 7/08 135/126 |
| 2012/0018478 A1 * | 1/2012 | Hanna | ................ | A45F 3/04 224/600 |
| 2012/0144756 A1 * | 6/2012 | Meager | ................ | E04H 9/16 52/1 |
| 2015/0342327 A1 * | 12/2015 | Berkson | ................ | A45F 4/04 224/154 |

* cited by examiner

*Primary Examiner* — Robert Canfield

(57) ABSTRACT

A housing has a front panel, a rear panel, side panels, a bottom panel, and an open top. A major chamber is within the housing. An envelope formed with a minor chamber is attached to one of the panels of the housing. A fire shelter system is removably positioned in the major chamber. A global positioning system is removably positioned within the envelope. A cord extending between the major chamber and the minor chamber couples the fire shelter system and the global positioning system. Deployment of the fire shelter system by removal from the major chamber will pull the cord to activate the global positioning system.

4 Claims, 3 Drawing Sheets

FIG. 3
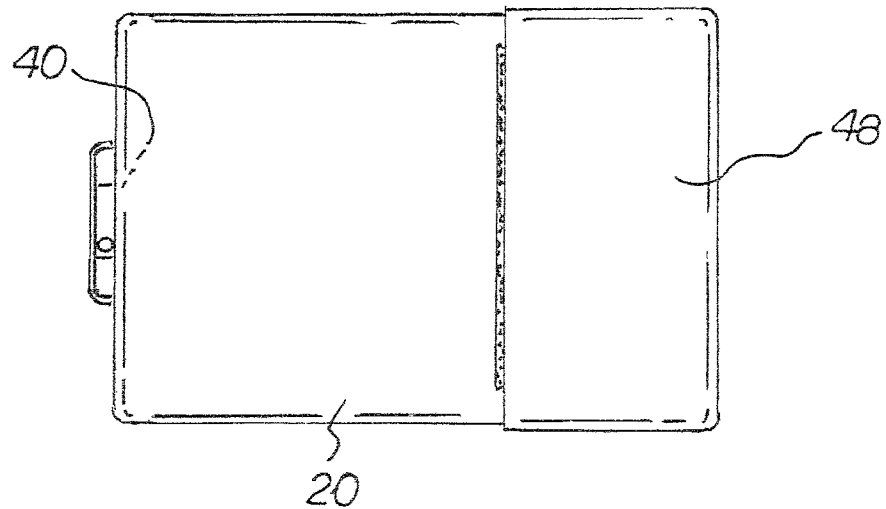
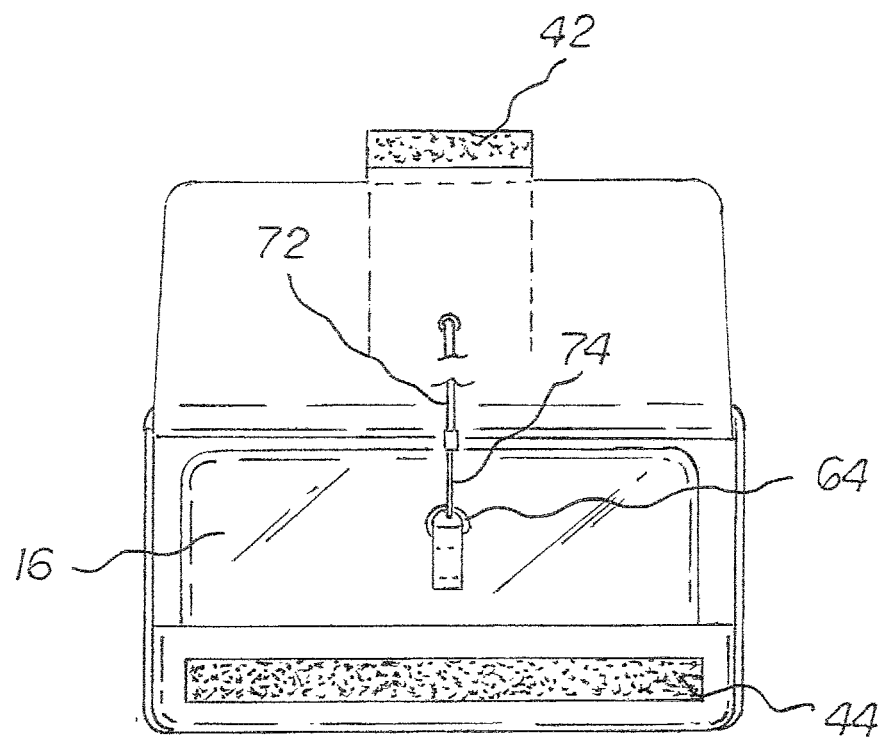
FIG. 4

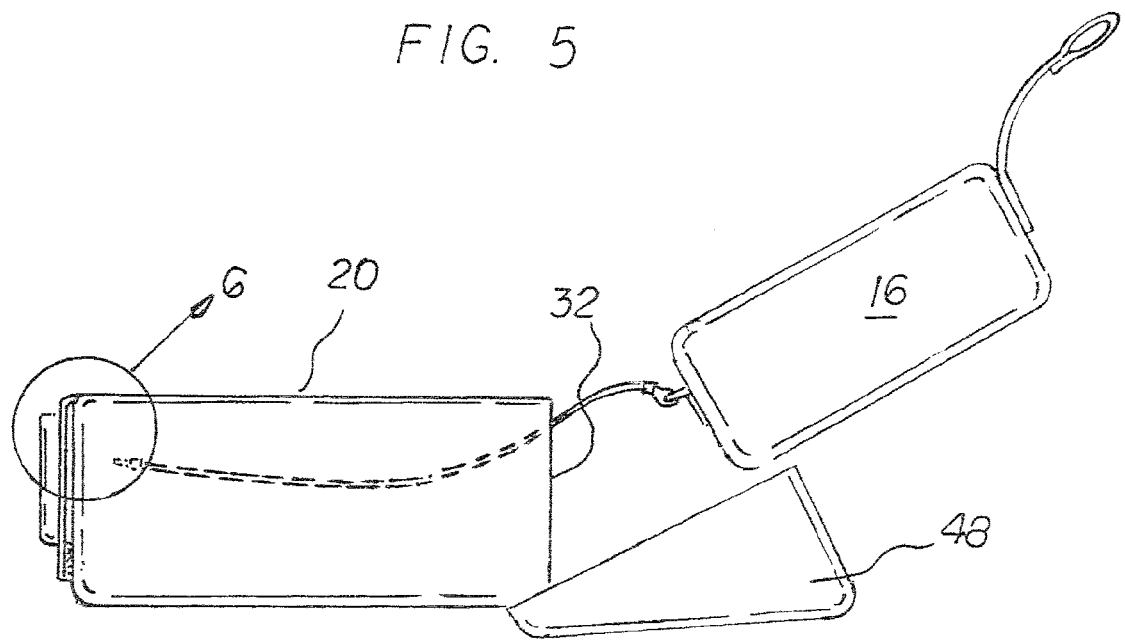
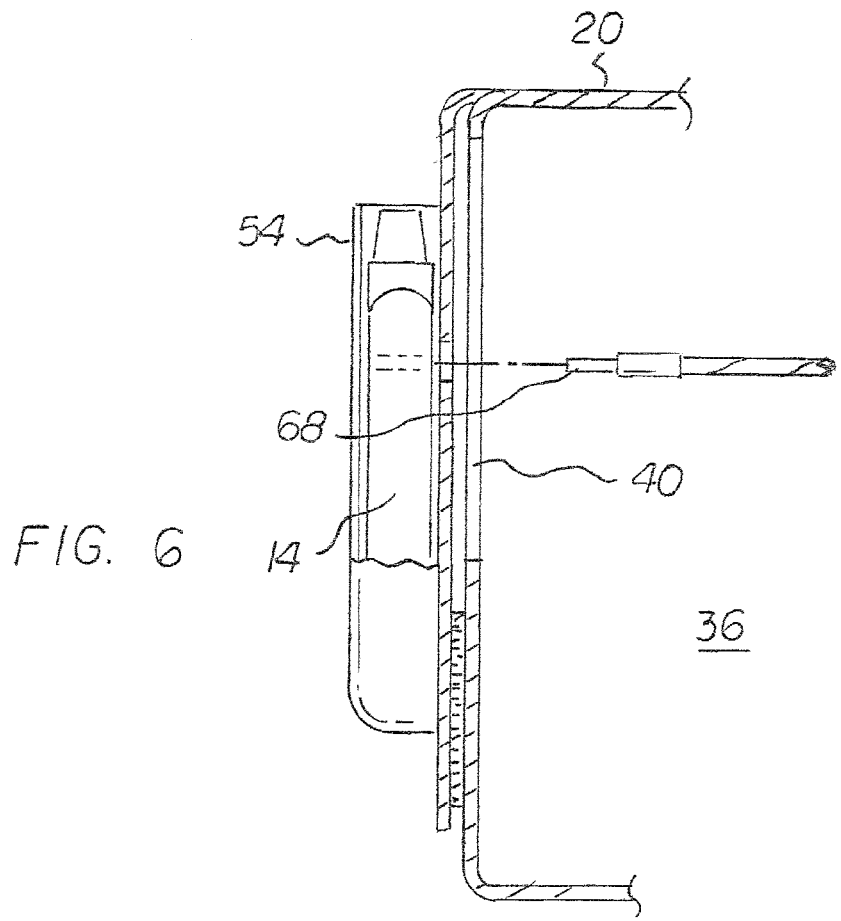

GLOBAL POSITIONING SYSTEM/FIRE SHELTER SYSTEM

BACKGROUND OF THE INVENTION

Field of the Invention

The present invention relates to a global positioning system/fire shelter system and more particularly pertains to supporting together a global positioning system and a fire shelter system, for deploying the fire shelter system in response to a fire emergency, and for activating the global positioning system in response to the deployment of the fire shelter system for locating a user of the fire shelter system, the supporting and the deploying and the activating being done in a safe, convenient, and economical manner.

Description of the Prior Art

The use of fire shelters and locating systems of known designs and configurations is known in the prior art. More specifically, fire shelters and locating systems of known designs and configurations previously devised and utilized for the purpose of providing and locating fire shelters are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the prior art does not describe a global positioning system/fire shelter system that allows coordinated global positioning and fire sheltering.

In this respect, the global positioning system/fire shelter system according to the present invention substantially departs from the conventional concepts and designs of the prior art, and in doing so provides an apparatus primarily developed for the purpose of supporting together a global positioning system and a fire shelter system, for deploying the fire shelter system in response to a fire emergency, and for activating the global positioning system in response to the deployment of the fire shelter system for locating a user of the fire shelter system. The supporting and the deploying and the activating are done in a safe, convenient, and economical manner.

Therefore, it can be appreciated that there exists a continuing need for a new and improved global positioning system/fire shelter system which can be used for supporting together a global positioning system and a fire shelter system, for deploying the fire shelter system in response to a fire emergency, and for activating the global positioning system in response to the deployment of the fire shelter system for locating a user of the fire shelter system. The supporting and the deploying and the activating are all done in a safe, and convenient, and economical manner. In this regard, the present invention substantially fulfills this need.

SUMMARY OF THE INVENTION

In view of the disadvantages inherent in the known types of global positioning and fire shelter systems of known designs and configurations now present in the prior art, the present invention provides an improved global positioning system/fire shelter system. As such, the general purpose of the present invention, which will be described subsequently in greater detail, is to provide a new and improved global positioning system/fire shelter system and method which has all the advantages of the prior art and none of the disadvantages of the prior art.

To attain this, the present invention, in a broad context, first includes a housing. The housing has a front panel, a rear panel, side panels, a bottom panel, and an open top. A major chamber is within the housing. An envelope formed with a minor chamber is attached to one of the panels of the housing. A fire shelter system is removably positioned in the major chamber. A global positioning system is removably positioned within the envelope. A cord extending between the major chamber and the minor chamber couples the fire shelter system and the global positioning system. Deployment of the fire shelter system by removal from the major chamber will pull the cord to activate the global positioning system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved global positioning system/fire shelter system which has all of the advantages of the prior art fire shelters and locating systems of known designs and configurations and none of the disadvantages.

It is another object of the present invention to provide a new and improved global positioning system/fire shelter system which may be easily and efficiently manufactured and marketed.

It is a further object of the present invention to provide a new and improved global positioning system/fire shelter system which is of durable and reliable constructions.

An even further object of the present invention is to provide a new and improved global positioning system/fire shelter system which is susceptible of a low cost of manufacture with regard to both materials and labor, and which accordingly is then susceptible of low prices of sale, thereby making such global positioning system/fire shelter system economically available.

Even still another object of the present invention is to provide a global positioning system/fire shelter system for supporting together a global positioning system and a fire shelter system, for deploying the fire shelter system in response to a fire emergency, and for activating the global positioning system in response to the deployment of the fire shelter system for locating a user of the fire shelter system. The supporting and the deploying and activating are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated a primary, preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the system taken along line 3-3 of FIG. 1.

FIG. 4 is a top view of the system shown in the prior Figures but with the lid open and the fire shield inside.

FIG. 5 is a side elevational view of the system similar to FIG. 1 but with the lid open.

FIG. 6 is an enlarged cross sectional view of the system taken at circle 6 of FIG. 5.

The same reference numerals refer to the same parts throughout the various Figures.

DESCRIPTION OF THE PREFERRED EMBODIMENT

Figure 1:
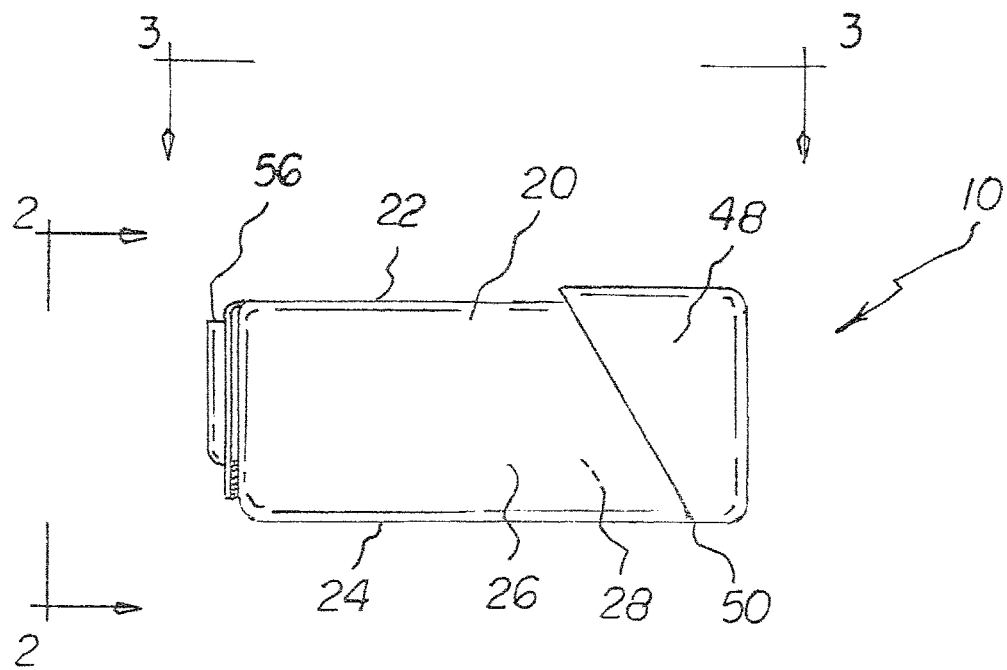
FIG. 1 is a side elevational view of a global positioning system/fire shelter system constructed in accordance with the principles of the present invention.
Figure 2:
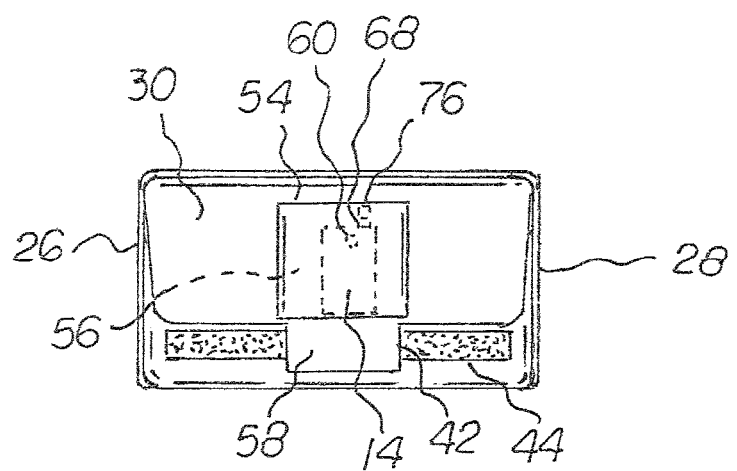
FIG. 2 is a bottom view of the system taken along line 2-2 of FIG. 1.

With reference now to the drawings, and in particular to FIG. 1 thereof, the preferred embodiment of the new and improved global positioning system/fire shelter system embodying the principles and concepts of the present invention and generally designated by the reference numeral 10 will be described.

The present invention, the global positioning system/fire shelter system 10 is comprised of a plurality of components. In their broadest context such include a housing, an envelope, a fire shelter system, a global positioning system, and a cord. Such components are individually configured and correlated with respect to each other so as to attain the desired objective.

In the preferred embodiment of the global positioning system/fire shelter system, designated by reference numeral 10, a housing 20 is provided. The housing is formed in a generally rectilinear configuration. The housing has a front panel 22. The housing has a parallel rear panel 24. The housing has a left side panel 26. The housing also has a parallel right side panel 28. The housing has a bottom panel 30. The housing also has an open top 32. The housing further has a major chamber 36. The major chamber is in a generally rectilinear configuration. The major chamber is provided within the housing between the front panel, rear panel, left side panel, right side panel, and bottom panel. The bottom panel is pivotably coupled to the front panel. In this manner an access opening 40 to the major chamber is provided. Hook and loop fasteners 42, 44 are provided. The hook and loop fasteners are adapted to hold the bottom panel closed. The housing also includes a lid 48. The lid has a hinge 50. The hinge pivotably secures the lid to the rear panel adjacent to the open top. The lid is movable between a closed orientation and an open orientation. In this closed orientation, the lid covers the opening. In this open orientation access to the major chamber is provided. The housing is fabricated of a conformable fabric.

An envelope 54 is provided. The envelope is constructed in a rectangular configuration. The envelope has a minor chamber 56. The envelope also has a flap 58. The flap is pivotable between a closed orientation and an open orientation. In this closed orientation the flap covers the minor chamber. In this open orientation access to the minor chamber is provided. The envelope is fabricated of a conformable fabric. The envelope is attached to the bottom panel of the housing exterior of the major chamber. The bottom panel has an aperture 60. In this manner a passageway between the major chamber and the minor chamber is created.

Provided next is a fire shelter system 16. The fire shelter system is folded into a rectilinear configuration. The configuration of the folded fire shelter system corresponds to the rectilinear configuration of the major chamber. The folded fire shelter system is removably housed in the major chamber. A D-ring 64 is provided. The D-ring is attached to the folded fire shelter system. The D-ring is located adjacent to the bottom panel of the housing.

Further provided is a global positioning system 14. The global positioning system is removably positioned within the envelope. The global positioning system includes a pull tab 68. The pull tab is adapted to be pulled. In this manner the global positioning system is activated.

Provided last is a cord 72. The cord extends between the major chamber and the minor chamber. The cord further extends through the aperture. The cord has a first clip 74. The first clip is removably coupled to the D-ring of the fire shelter system. The cord has a second clip 76. The second clip is removably coupled to the pull tab of the global positioning system. In this manner deployment of the fire shelter system by removal from the major chamber will pull the cord and the pull tab. In this manner the global positioning system will be activated. Also in this manner the global positioning system will be rendered operative. Further in this manner the user of the system will be locatable through an electronic output of the activated global positioning system.

The present invention may be considered a fire find, a global positioning system (GPS) emergency locator beacon for fire shelter systems. This invention is the first in the next generation of fire shelter system deployment trackability. The fire find GPS emergency locator beacon, compatible with all fire shelters, will instantly advise the command staff of the exact deployment location and the number of shelters deployed. Knowing the exact time and the location and number of firefighters who have been forced to deploy their shelters will greatly enhance the ability of the command staff to commence rescue operations immediately.

Combined with the low profile, rapid deploy carrier, it allows for easy and quick deployment even when wearing cumbersome gloves.

Once a fire shelter system has been pulled from the shelter carrier, the emergency trigger mechanism will activate the GPS transmitter. The GPS transmitter will send an emergency locator and beacon to a mapping application to which dispatch and command staff will be immediately notified of a fire shelter system deployment.

The fire find specialized fire shelter carrier with fire find system can fit the existing new generation fire shelter.

The fire find trigger and transmitter system can be utilized with any fire shelter system.

The fire find can be programmed to allow for use in conjunction with the firewatch family of unmanned aerial vehicles. It is possible to get both visual and thermal imagery of the deployment site and provide a visual beacon for tanker aircraft to use for emergency retardant drops.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function, and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A global positioning system/fire shelter system comprising:
   a housing having a front panel, a rear panel, side panels, a bottom panel, an open top, and a major chamber within the housing;
   an envelope formed with a minor chamber attached to one of the panels of the housing;
   a fire shelter system removably positioned in the major chamber;
   a global positioning system removably positioned within the envelope; and
   a cord extending between the major chamber and the minor chamber coupling the fire shelter system and the global positioning system whereby deployment of the fire shelter system by removal from the major chamber will pull the cord to activate the global positioning system.

2. The system as set forth in claim 1 wherein:
   the cord includes a first end with a first clip removably coupled to the fire shelter system; and
   the cord includes a second end with a second clip removably coupled to the global positioning system.

3. The system as set forth in claim 1 and further including:
   a lid; and
   a hinge pivotably securing the lid to the rear panel adjacent to the top, the lid being movable between a closed orientation covering the open top and an open orientation providing access to the major chamber.

4. A global positioning system/fire shelter system (10) for supporting together a global positioning system (14) and a fire shelter system (16), for deploying the fire shelter system in response to a fire emergency, and for activating the global positioning system in response to the deployment of the fire shelter system for locating a user of the fire shelter system, the supporting and the deploying and the activating being done in a safe, convenient, and economical manner, the system comprising, in combination:
   a housing (20) formed in a generally rectilinear configuration, the housing having a front panel (22) and a parallel rear panel (24), the housing having a left side panel (26) and a parallel right side panel (28), the housing having a bottom panel (30) and an open top (32), a major chamber (36) in a generally rectilinear configuration within the housing between the front panel, rear panel, left side panel, right side panel, and bottom panel, the bottom panel being pivotably coupled to the front panel to provide an access opening (40) to the major chamber, hook and loop fasteners (42) (44) adapted to hold the bottom panel closed, the housing also including a lid (48) with a hinge (50) pivotably securing the lid to the rear panel adjacent to the open top, the lid being movable between a closed orientation covering the opening and an open orientation providing access to the major chamber, the housing being fabricated of a conformable fabric;
   an envelope (54) constructed in a rectangular configuration and formed with a minor chamber (56), the envelope having a flap (58) pivotable between a closed orientation covering the minor chamber and an open orientation providing access to the minor chamber, the envelope being fabricated of a conformable fabric, the envelope being attached to the bottom panel of the housing exterior of the major chamber, an aperture (60) in the bottom panel providing a passageway between the major chamber and the minor chamber;
   the fire shelter system (16) folded into a rectilinear configuration generally corresponding to the rectilinear configuration of the major chamber, the folded fire shelter system being removably housed in the major chamber, a D-ring (64) attached to the folded fire shelter system and located adjacent to the bottom panel of the housing;
   the global positioning system (14) removably positioned within the envelope, the global positioning system including a pull tab (68) adapted to be pulled for activating the global positioning system; and
   a cord (72) extending between the major chamber and the minor chamber and extending through the aperture, the cord having a first clip (74) removably coupled to the D-ring of the fire shelter system, the cord having a second clip (76) removably coupled to the pull tab of the global positioning system whereby deployment of the fire shelter system by removal from the major chamber will pull the cord and the pull tab to activate the global positioning system and render the system and the user of the system locatable through an electronic output of the activated global positioning system.

* * * * *